United States Patent
Chirca et al.

(10) Patent No.: US 9,424,193 B2
(45) Date of Patent: *Aug. 23, 2016

(54) FLEXIBLE ARBITRATION SCHEME FOR MULTI ENDPOINT ATOMIC ACCESSES IN MULTICORE SYSTEMS

(71) Applicant: Texas Instruments Incorporated, Dallas, TX (US)

(72) Inventors: Kai Chirca, Dallas, TX (US); Matthew D Pierson, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,945

(22) Filed: Nov. 11, 2015

(65) Prior Publication Data

US 2016/0062887 A1 Mar. 3, 2016

Related U.S. Application Data

(62) Division of application No. 14/061,470, filed on Oct. 23, 2013, now Pat. No. 9,213,656.

(60) Provisional application No. 61/717,831, filed on Oct. 24, 2012.

(51) Int. Cl.
| | |
|---|---|
| *G06F 13/00* | (2006.01) |
| *G06F 12/08* | (2016.01) |
| *G06F 11/10* | (2006.01) |
| *G06F 3/06* | (2006.01) |
| *G06F 13/16* | (2006.01) |

(52) U.S. Cl.
CPC .............. *G06F 12/084* (2013.01); *G06F 3/061* (2013.01); *G06F 3/064* (2013.01); *G06F 3/0683* (2013.01); *G06F 11/1064* (2013.01); *G06F 13/1668* (2013.01); *G06F 13/1652* (2013.01); *G06F 2212/1016* (2013.01); *G06F 2212/60* (2013.01)

(58) Field of Classification Search
CPC ........................ G06F 11/1064; G06F 13/1652
See application file for complete search history.

(56) References Cited

U.S. PATENT DOCUMENTS 9,213,656 B2 * 12/2015 Chirca ................ G06F 13/1668
2012/0079102 A1 * 3/2012 Damodaran ....... H03K 19/0016
709/224

* cited by examiner

*Primary Examiner* — Zachary K Huson
(74) *Attorney, Agent, or Firm* — Robert D. Marshall, Jr.; Frank D. Cimino

(57) ABSTRACT

The MSMC (Multicore Shared Memory Controller) described is a module designed to manage traffic between multiple processor cores, other mastering peripherals or DMA, and the EMIF (External Memory InterFace) in a multicore SoC. The invention unifies all transaction sizes belonging to a slave previous to arbitrating the transactions in order to reduce the complexity of the arbitration process and to provide optimum bandwidth management among all masters. Two consecutive slots are assigned per cache line access to automatically guarantee the atomicity of all transactions within a single cache line. The need for synchronization among all the banks of a particular SRAM is eliminated, as synchronization is accomplished by assigning back to back slots.

6 Claims, 1 Drawing Sheet

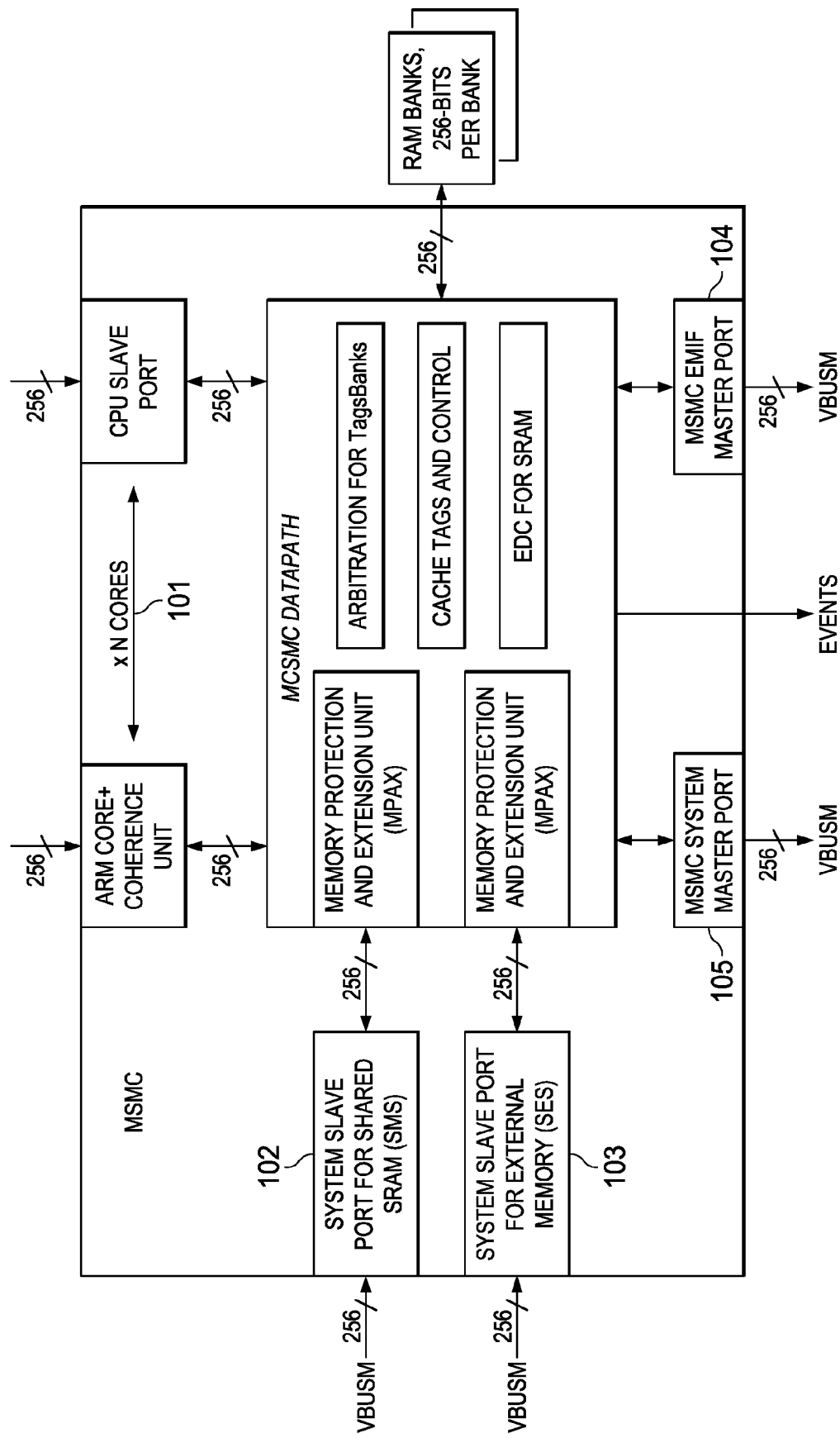

FLEXIBLE ARBITRATION SCHEME FOR MULTI ENDPOINT ATOMIC ACCESSES IN MULTICORE SYSTEMS

CLAIM OF PRIORITY

This application: is a divisional of U.S. patent application Ser. No. 14/061,470, filed Oct. 23, 2013.

This application claims priority under 35 U.S.C. 119(e)(1) to Provisional Application No. 61/717,831 filed 24 Oct. 2012.

TECHNICAL FIELD OF THE INVENTION

The technical field of this invention is multicore processing systems.

BACKGROUND OF THE INVENTION

In a multi-core coherent system, multiple central processing unit (CPU) and system components share the same memory resources, such as on-chip and off-chip RAMS. Ideally, if all components had the same cache structure, and would access shared resource through cache transactions, all the accesses would be identical throughout the entire system, aligned with the cache block boundaries. But usually, some components have no caches, or, different components have different cache block sizes. For a heterogeneous system, accesses to the shared resources can have different attributes, types and sizes. On the other hand, the shared resources may also be in different format with respect to banking structures, access sizes, access latencies and physical locations on the chip.

To maintain data coherency, a coherence interconnect is usually added in between the master components and shared resources to arbitrate among multiple masters' requests and guarantee data consistency when data blocks are modified for each resource slave. With various accesses from different components to different slaves, the interconnect usually handles the accesses in a serial fashion to guarantee atomicity and to meet slaves access requests. This makes the interconnect the access bottleneck for a multi-core multi-slave coherence system.

To reduce CPU cache miss stall overhead, cache components could issue cache allocate accesses with the request that the lower level memory hierarchy must return the "critical line first" to un-stall the CPU, then the non-critical line to finish the line fill. In a shared memory system, to serve one CPU's "critical line first" request could potentially extend the other CPU's stall overhead and reduce the shared memory throughput if the memory access types and sizes are not considered. The problem therefore to solve is how to serve memory accesses from multiple system components to provide low overall CPU stall overhead and guarantee maximum memory throughput.

Due to the increased number of shared components and expended shareable memory space, to support data consistency while reducing memory access latency for all cores while maintaining maximum shared memory bandwidth and throughput is a challenge. Speculative memory access is one of the performance optimization methods adopted in hardware design.

SUMMARY OF THE INVENTION

The invention described unifies all transaction sizes belonging to a slave previous to arbitrating the transactions in order to reduce the complexity of the arbitration process and to provide optimum bandwidth management among all masters.

Two consecutive slots are assigned per cache line access to automatically guarantee the atomicity of all transactions within a single cache line.

The need for synchronization among all the banks of a particular SRAM is eliminated, as synchronization is accomplished by assigning back to back slots.

BRIEF DESCRIPTION OF THE DRAWING

These and other aspects of this invention are illustrated in the drawing, in which:

The FIGURE shows a high level block diagram of the Multicore Shared Memory Controller.

DETAILED DESCRIPTION OF PREFERRED EMBODIMENTS

The MSMC (Multicore Shared Memory Controller) is a module designed to manage traffic between multiple processor cores, other mastering peripherals or DMA, and the EMIF (External Memory InterFace) in a multicore System on Chip (SoC). The MSMC provides a shared on-chip memory that can be used either as a shared on-chip SRAM or as a cache for external memory traffic. The MSMC module is implemented to support a cluster of up to eight processor cores and be instantiated in up to four such clusters in a multiprocessor SoC. The MSMC includes a Memory Protection and Address eXtension unit (MPAX), which is used to convert 32-bit virtual addresses to 40-bit physical addresses, and performs protection checks on the MSMC system slave ports. The following features are supported in one implementation of the MSMC:

- Configurable number of CPU cores,
- One 256-bit wide EMIF master port,
- One 256-bit wide System Master port,
- Two 256-bit wide System Slave ports,
- CPU/1 frequency operation in MSMC,
- Level 2 or 3 SRAM shared among connected processor cores and DMA,
- Write transaction merge support for SRAM accesses,
- Supports 8 SRAM banks, each can be accessed in parallel every clock cycle,
- Each SRAM bank has 4 virtual sub-banks,
- Memory protection for EMIF and MSMC SRAM space accesses from system masters,
- Address extension from 32 bits to 40 bits for system master accesses to shared memory and external memory,
- Optimized support for prefetch capabilities,
- System trace monitor support and statistics collection with CP_Tracer (outside MSMC) and AET event export,
- EDC and scrubbing support for MSMC memory (SRAM and cache storage),
- Firewall memory protection for SRAM space and DDR space,
- MPAX support for SES and SMS,
- MPAX provides 32 to 40 bit address extension/translation,
- MPAX includes a Main TLB and uTLB memory page attribute caching structure,
- Coherency between A15 L1/L2 cache and EDMA/10 peripherals through SES/SMS port in SRAM space and DDR space.

The FIGURE shows a high level view of the MSMC module that includes the main interfaces, memory, and subunits.

The MSMC has a configurable number of slave interfaces 101 for CPU cores, two full VBusM slave interfaces 102 and 103 for connections to the SoC interconnect, one master port 104 to connect to the EMIF and one master port 105 to connect to the chip infrastructure.

Each of the slave interfaces contains an elastic command buffer to hold one in-flight request when the interface is stalled due to loss of arbitration or an outstanding read data return. During that time, the other slave interfaces can continue to field accesses to endpoints that are not busy.

The invention described implemented in a Multicore Shared Memory Controller, (MSMC) implements the following features:

Segmentation of non-cacheline aligned requests for non-cacheable but shared transactions to enable parallel transactions to multiple slaves in atomic fashion;

Segmentation size is optimized to slave access request and master cache line size;

In the MSMC platform, a shared on-chip SRAM is implemented as scratch memory space for all master components. This SRAM space is split into 8 parallel banks with the data width being the half of the cache line size. The segmentation boundary for the on-chip SRAM space is set to align with the bank data width size, and the MSMC central arbiter for on-chip SRAM banks reserves two back-to-back slots for each command worth of a single cache line fill;

MSMC also handles all masters' accesses to the off-chip DRAM space. The optimum access size is equal or larger than the cache line size. MSMC segmentation logic takes this slave request into account to split the commands on the cache line boundaries. The MSMC central arbiter for off-chip DRAM reserves two back-to-back slots for two commands worth of two cache line fills;

If the command is less than a cache line size and couldn't fill in the clock cycles required for a full cache line allocate command, segmentation logic inserts a dummy command cycle to fill in the dummy bank slot;

Due to the number of cores, size of on-chip SRAM and number of banks, the physical size of MSMC doesn't allow the central arbiter function to be completed in a single execution clock cycle. With two reserved cycles per command, the second cycle will take the decision from the first cycle, therefore the central arbiter doesn't need to be done in a single cycle;

Memory access order is set to make sure the maximum memory bandwidth is utilized;

Reverse write dataphases before committing if the critical line first request forces the higher address location dataphase to be written first;

Reverse read returns if the higher address location dataphase is required to be to returned first by the component;

Performance benefit in virtually banked SRAM memories since steps are always monotonic between virtual banks;

Allows simplified virtual banking arbitration by effectively halving the number of virtual banks, and the MSMC central arbiter for off-chip DRAM reserves two back-to-back slots for two commands worth of two cache line fills;

Each component has a dedicated return buffer which gets force-linear info for read return;

Reference look-ahead message in distributed data return storage allowing this;

Off-chip memory return without force-linear returns in different order;

Each CPU has its own return buffer. The entry number of the return buffer is configurable to address different round trip latencies;

With the addition of return buffer, MSMC passes each CPU's memory access request to the slaves without holding and treats them as speculative read requests. Meanwhile, if the request is to shared memory space, MSMC issues snoop request to the corresponding cache components. When both memory response and snoop response are returned, MSMC orders these responses in the return buffer per CPU bases according to data consistence rule;

To keep a record of the data access ordering for correct data coherence support without performance degradation, pre-data messages in all cases are generated and saved in each entry of return buffer before the memory request and snoop request are issued. This ensures optimum performance of both coherent and non-coherent accesses and avoids protocol hazarding. The metadata and status bits in each entry are
 a. Original memory request identification number;
 b. Ready bit acts are time stamp for the status match of the corresponding entry to kick off the snoop response waiting period. This is very important since MSMC support hit-under-miss if current request overlaps with a previous in-flight memory access. This bit is used to accumulate the correct snoop response sequence for data consistency;
 c. Force_linear bit indicates the order of dataphase returns to support each CPU's cache miss request for performance purposes;
 d. Shareable bit which indicates if the snoop request therefore the responses will be counted by the return buffer or not;
 e. Memory read valid bit indicates the corresponding memory access responses has landed in the return buffer entry;
 f. Snoop response valid bit indicates the corresponding snoop access responses has landed in the return buffer entry;
 g. Memory access error bit indicates a memory access error has occurred;
 h. Snoop response error bit indicates a snoop response error has occurred;

The return buffer also records the write respond status for coherence write hazard handling.

Both error response from memory access and snoop response will result in an error status return to the initiating master component.

To support fragmented read returns, byte strobes are stored on a per byte bases. Each bit represents whether a byte lane worth of data is valid or not. All byte lanes have to be merged before valid the bit is asserted.

What is claimed is:

1. A method for sharing resource among multiple central processing units comprising the steps of:
 connecting to a plurality of central processing units via respective CPU interfaces for receiving CPU transaction requests;
 connecting to a shared resource via at least one slave interface for connection to a corresponding slave device;
 receiving CPU transaction requests from central processing units via a corresponding CPU interface;
 arbitrating between CPU transaction requests and shared resources and operable to enforce data consistency when data blocks are modified for a resource slave;
 reserving two back to back slots for each CPU transaction processing a single cache line fill request from one of said plurality of CPU interfaces; and
 inserting a dummy command cycle if a slave interface access from one of the plurality of CPU interfaces requests less than a cache line size.

2. The method of claim 1, further comprising the step of:
segmenting non-cacheline aligned received CPU transaction requests.

3. The method of claim 1, further comprising the step of:
performing parallel CPU transaction requests to multiple slaves in an atomic fashion.

4. The method of claim 1, further comprising the step of:
employing a shared on chip memory as scratch memory for all CPU transaction requests;
segmenting the on chip memory into a plurality of parallel banks where the data width is sized to be half of the cache line size, and the segmentation boundaries for the on chip memory is aligned with the bank data width size.

5. The method of claim 1, further comprising the steps of:
processing all CPU transaction requests to off chip memory via an off chip memory interface with an optimum access size equal to or larger than the cache line size; and
segmenting the CPU transaction request to the off chip memory on cache line boundaries.

6. The method of claim 1, further comprising the step of:
reserving two back to back slots for two commands processing two cache line fills.

\* \* \* \* \*